Patented Apr. 17, 1945

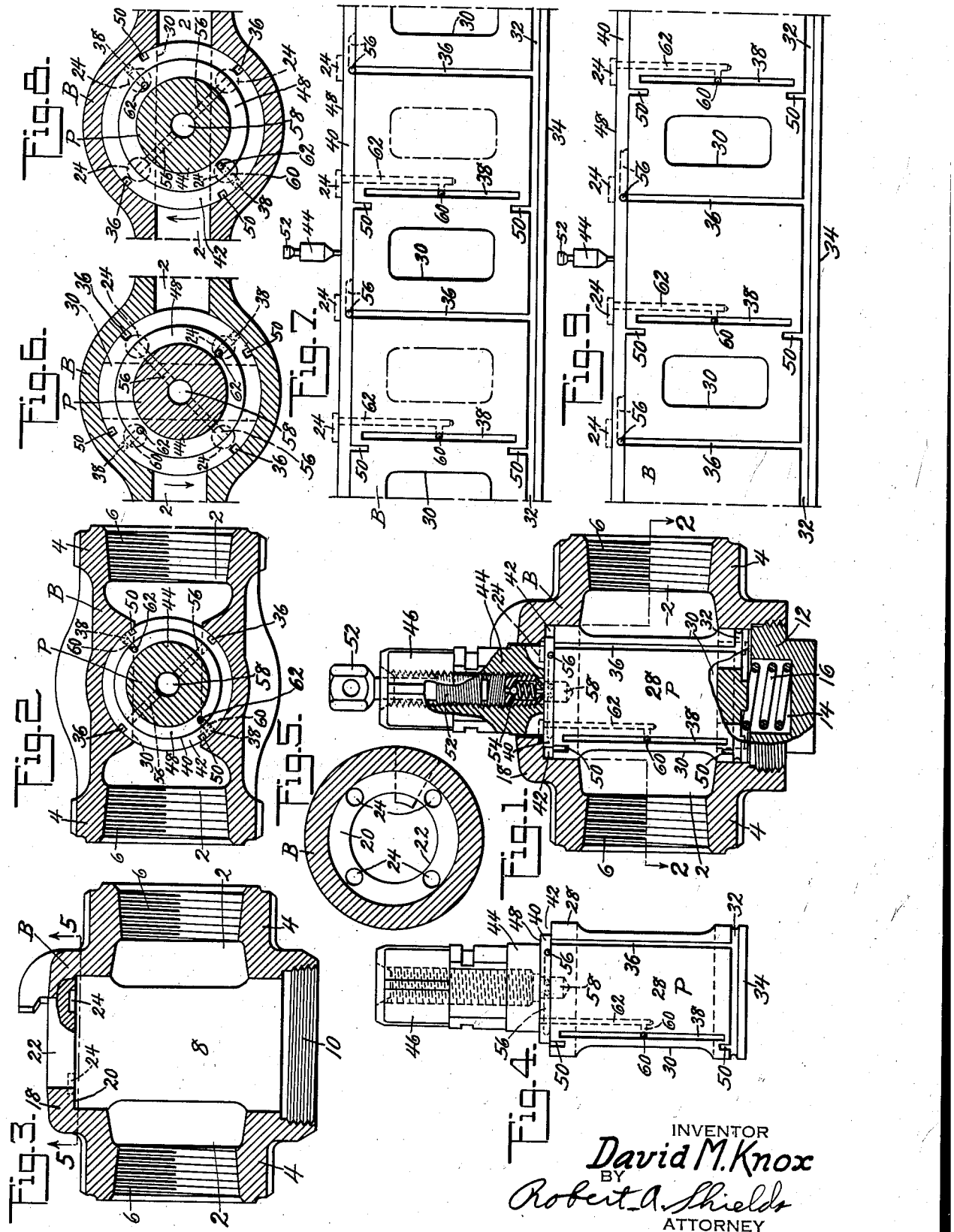

2,373,965

UNITED STATES PATENT OFFICE 2,373,965

LUBRICATED PLUG VALVE

David M. Knox, New York, N. Y., assignor to American Car and Foundry Company, New York, N. Y., a corporation of New Jersey Application July 2, 1943, Serial No. 493,217

4 Claims. (Cl. 251—93)

This invention relates to valves in general and in particular to plug valves of the lubricated type. In plug valves of the lubricated type the seal is effected by close fitting of parts combined with the smearing of lubricant between the seating surfaces of the closely fitting parts. In order to effectively smear the seating surfaces, it is necessary that lubricant supply ducts be provided and since there is relative motion between the plug and body, the ducts must be arranged to completely smear the seating surfaces during such relative movement. Full and complete smearing of the seating surfaces cannot be effected without one or more of the supply ducts being exposed to line fluid during the turning of the plug in the body. It is an object, therefore, of the present invention to provide a lubricated plug valve in which the seating surfaces are effectively smeared by supply ducts, certain of which are cut off from the source of lubricant when exposed to the flow of line fluid.

A further object of the invention is the provision of a lubricated plug valve having lubricant supply ducts cut in the seating surfaces and so arranged as to have certain of the ducts cut off from the lubricant supply except when the plug is approximately in full open or full closed position.

A still further object of the invention is the provision of a lubricated valve of the plug type in which the control of lubricant flow to the exposed grooves or ducts is effected by the relative motion of the plug and body head seating surfaces.

These and other objects of the invention will be apparent to persons skilled in the art from a study of the following description and accompanying drawing, in which:

Figure 1 is a partial sectional view of the improved valve and showing the same in open position;

Fig. 2 is a sectional view taken substantially on line 2—2 of Fig. 1;

Fig. 3 is a sectional view of the body alone;

Fig. 4 is an elevational view of the plug alone;

Fig. 5 is a sectional view taken substantially on line 5—5 of Fig. 3;

Fig. 6 is a partial sectional view showing the position of parts with the valve in closed position;

Fig. 7 is a view showing the development of the valve seating surfaces and the relation of the various grooves and ducts when the valve is in closed position;

Fig. 8 is a partial sectional view similar to Fig. 6 but showing the relationship of parts when the valve is in open position; while Fig. 9 is a development of the seating surfaces with the valve in the open position as shown in Fig. 8.

Referring now to the drawing in detail, it will be seen that the valve is constructed of two main parts, namely, the body B and the plug P, which is of cylindrical form. The body B is preferably made in one piece, having a passageway 2 extending therethrough and defined by flanges 4 which, in the present case, are internally threaded as at 6 to be coupled to piping or other parts of a system. Extending substantially at right angle to the passageway 2 is a cylindrical bore having the inner surface carefully machined or otherwise finished to provide a body seating surface 8 interrupted, as clearly shown, by the passageway 2. The lower end of the bore is counterbored and threaded as at 10 to receive the base cap 12. The center part of this base cap is bored out as at 14 to receive a compression spring 16. The opposite end of the bore is partially closed by head flanges 18, having the inner surfaces carefully machined or otherwise finished to provide a head seating surface 20 surrounding an opening or hole 22, through which the plug stem, later to be described, may extend. The head seating surface 20 is interrupted, as clearly shown, particularly in Fig. 5, by diametrically opposed circular recesses or cavities 24. These cavities or recesses are arranged on either side of the planes defining the passageway 2 and as more clearly shown in Figs. 6 and 8. While these recesses or cavities have been shown as circular in form, it is, of course, obvious that they may be made of any suitable outline so long as they are positioned so as to accomplish the result desired and as later explained.

The plug P is generally cylindrical in form and has its outer surface carefully machined or otherwise finished to provide a smooth seating surface 28, which seating surface is interrupted by a passageway 30 extending radially through the plug and of a cross-sectional area substantially equal to the cross-sectional area of the passageway 2 in order that the flow of material through the valve will be unrestricted when the plug is in open position. The seating surface 28 is also interrupted by a lower circumferential groove 32 extending completely around the plug in spaced relation to the base part or end 34. In the assembled position as shown in Fig. 1, the base part of the plug rests upon the upper end of the compression spring 16 which is so designed as to force the plug toward the head of the body. Intersecting the circumferential groove 32 are comparatively long longitudinal grooves 36 interrupting the plug seating surface at diametrically opposed points adjacent opposite sides of the passageway 30. The plug seating surface 28 is further interrupted by diametrically opposed relatively short longitudinal grooves 38, which grooves terminate short of the circumferential groove 32 and of the upper end of the plug. The upper end of the plug is provided with a shoulder 40 stepped back from the surface 28 to provide an annular groove 42 occupying the upper corner of the plug between the seating surface 28 and the shoulder 40. Extending upwardly from the stepped shoulder 40 is a cylindrical stem 44 of such a diameter as to extend through the hole 22 in the head of the valve body and which stem is so formed as to provide a wrench-receiving portion 46. The upper surface of shoulder 40 is carefully machined or otherwise finished to provide a head seating surface 48 surrounding the stem and interposed between the annular groove 42 and the stem and adapted to cooperate with the seating surface 20 of the valve body. The cylindrical seating surface 28 of the plug is additionally interrupted by short stub grooves 50, certain of which extend upwardly from circumferential groove 32, while others extend downwardly from annular groove 42 and of such a length as to overlap the ends of the comparatively short longitudinal grooves 38. In order to supply lubricant to the various grooves, previously referred to, the stem of the plug is axially bored and threaded to receive a ram or screw 52 and a check valve assembly 54. Lubricant inserted in the axial bore of the stem may be placed under pressure by means of the screw 52 and can escape from the axial bore by means of radial holes 56 extending outwardly from the lower end 58 of the axial bore and terminating in the annular groove 42. The lubricant forced through radial holes 56 will, of course, fill annular groove 42 and can then flow downwardly through comparatively long longitudinal grooves 36 into the lower circumferential groove 32 which will likewise be filled. Obviously, with circumferential groove 32 and annular groove 42 full of lubricant, the stub grooves 50 will also be filled. Also, since the cavities 24 are of sufficient size as to overlap the annular groove 42, as clearly shown in Figs. 6 and 8, they likewise will be filled. In other words, cavities 24, circumferential groove 32, annular groove 42, comparatively long longitudinal grooves 36 and stub grooves 50 may be at all times filled and kept full by lubricant flowing under pressure through radial holes 56. In order to supply lubricant to the comparatively short longitudinal grooves 38, short radial holes 60 are bored inwardly to intersect the lower ends of holes 62 extending downwardly from the stepped shoulder seating surface 48 and substantially parallel to the axis of the plug. The upper ends of these passages 62, of course, interrupt the plug head seating surface 48 and can be supplied with lubricant only when the upper ends of the holes or passages register with the cavities 24 formed in the head of the body. At all other times the passages 62 will be cut off from the lubricant supply by the cooperation of the head seating surfaces 20 and 48 formed on the body and plug respectively. Rotation of the plug in the body will, of course, cause grooves 36, 38 and 50 to effectively smear the cylindrical seating surfaces of the plug and body. The smearing obtained by stub grooves 50 will effectively block any leakage of line fluid passed or around the ends of the comparatively short longitudinal grooves 38. Overflow from the circumferential groove 32 and annular groove 42 will effectively seal the lower and upper ends of the plug against leakage, while the head seating surfaces 20 and 48 will be effectively smeared by the lubricant carried in the cavities 24 and upper ends of passageways 62.

It is believed that the operation of the valve will be obvious from the preceding description, however, particular attention is directed to Figs. 7 and 9, clearly showing the relationship of the various grooves and passageways when the valve is in the full closed or open positions. In both the full closed and full open positions all grooves and passageways can be supplied with lubricant under pressure and will, together with the smeared lubricant, form a complete seal surrounding the passageways or ports. When, however, the plug is not in full open or full closed position, the passageways 62 will be out of register with cavities 24 and lubricant can not be supplied to comparatively short longitudinal grooves 38. In other words, when the comparatively short longitudinal grooves 38 are moving across the passageways 2, they are cut off or wholly isolated from the remainder of the system which can be supplied by lubricant. In this manner excessive washout of lubricant is prevented as well as any blow-by that might occur if passages 62 were in any way connected with each other or with the remainder of the lubricating system. It is obvious, of course, that during the movement from full open to full closed position the smeared lubricant will effectively seal the valve and prevent leakage. It is equally obvious that any lubricant washed out of comparatively short longitudinal grooves 38 can be replaced from the pressure source whenever the valve is in full open or full closed position.

While the valve has been described more or less in detail with specific reference to a cylindrical type of plug it will be obvious that the groove arrangement and lubricating system could be applied equally well to a tapered type of plug valve. It will also be obvious that various modifications and rearrangements of parts other than those shown and described may be made and all such modifications are contemplated as will fall within the scope of the appended claims defining my invention.

What is claimed is:

1. In a lubricated valve the combination of a valve body having a passageway therethrough for the flow of matter, a bore formed in the body and having its axis substantially normal to the axis of said passageway and its walls finished to provide a body seating surface, a body head portion at least partially closing one end of said bore and internally finished to provide a body head seating surface, a plurality of cavities formed in said body head portion and interrupting said body head seating surface, a valve plug rotatably mounted in said bore and having the side and at least parts of one end finished to provide respectively plug and plug head seating surfaces, a passageway through the valve plug and adapted to register with said body passageway for flow of matter when said valve is in full open position, an annular groove located at the head end of the plug and overlapped by said cavities at all times and reducing the area of both the plug and plug head seating surfaces, a circumferential groove interrupting the plug seating surface adjacent the lower edge thereof, a first set of longitudinal grooves interrupting the plug seating surface and connecting said annular and circumferential grooves, a second set of longitudinal grooves interrupting said plug seating surface intermediate the grooves of said first set but free of connetcion therewith, a source of lubricant pressure carried by the plug, means for supplying lubricant at all times from said source to said annular groove and to said cavities and first set of longitudinal grooves and circumferential groove, and additional means connected to said second set of longitudinal grooves for supplying lubricant thereto from certain of said cavities when said valve is in substantially full open or closed position.

2. In a lubricated valve the combination of a valve body having a passageway therethrough for the flow of matter, a bore formed in the body and having its axis substantially normal to the axis of said passageway and its walls finished to provide a body seating surface, a body head portion at least partially closing one end of said bore and internally finished to provide a body head seating surface, a plurality of cavities formed in said body head portion and interrupting said body head seating surface, a valve plug rotatably mounted in said bore and having the side and at least parts of one end finished to provide respectively plug and plug head seating surfaces, a passageway through the valve plug and adapted to register with said body passageway for flow of matter when said valve is in full open position, an annular groove located at the head end of the plug and overlapped by said cavities at all times and reducing the area of both the plug and plug head seating surfaces, a circumferential groove interrupting the plug seating surface adjacent the lower edge thereof, a first set of longitudinal grooves interrupting the plug seating surface and connecting said annular and circumferential grooves, a second set of longitudinal grooves interrupting said plug seating surface intermediate the grooves of said first set but free of connection therewith, a source of lubricant pressure carried by the plug, means for supplying lubricant at all times from said source to said annular groove and to said cavities and first set of longitudinal grooves and circumferential groove, and additional means connected to said second set of longitudinal grooves for supplying lubricant thereto from certain of said cavities when said valve is in substantially full open or closed position, said additional means including passages interrupting said plug head seating surface inwardly of said annular groove and communicating with said cavities only when said valve is in substantially full open or closed position.

3. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of cavities formed in said body head portion and interrupting said body head seating surface, a substantially cylindrical valve plug rotatably mounted in said bore and having the side and at least parts of one end finished to provide respectively plug and plug head seating surfaces, a passageway through the valve plug and adapted to register with said body passageway for flow of matter when said valve is in full open position, an annular groove located at the head end of the plug and overlapped by said cavities at all times and reducing the area of both the plug and plug head seating surfaces, a circumferential groove interrupting the plug seating surface adjacent the lower edge thereof, a first set of longitudinal grooves interrupting the plug seating surface and connecting said annular and circumferential grooves, a second set of longitudinal grooves interrupting said plug seating surface intermediate the grooves of said first set but free of connection therewith, a source of lubricant pressure carried by the plug, means for supplying lubricant at all times from said source to said annular groove and to said cavities and first set of longitudinal grooves and circumferential groove, additional means connected to said second set of longitudinal grooves for supplying lubricant thereto from certain of said cavities when said valve is in substantially full open or closed position, and stub grooves extending upwardly from said circumferential groove and downwardly from said annular groove adjacent to and in overlapping relation to said second set of longitudinal grooves, said stub grooves serving to smear lubricant on the seating surfaces above and below the plug passages during turning of the valve.

4. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of cavities formed in said body head portion and interrupting said body head seating surface, a substantially cylindrical valve plug rotatably mounted in said bore and having the side and at least parts of one end finished to provide respectively plug and plug head seating surfaces, a passageway through the valve plug and adapted to register with said body passageway for flow of matter when said valve is in full open position, an annular groove located at the head end of the plug and overlapped by said cavities at all times and reducing the area of both the plug and plug head seating surfaces, a circumferential groove interrupting the plug seating surface adjacent the lower edge thereof, a first set of longitudinal grooves interrupting the plug seating surface and connecting said annular and circumferential grooves, a second set of longitudinal grooves interrupting said plug seating surface intermediate the grooves of said first set but free of connection therewith, a source of lubricant pressure carried by the plug, means for supplying lubricant at all times from said source to said annular groove and to said cavities and first set of longitudinal grooves and circumferential groove, and additional means connected to said second set of longitudinal grooves for supplying lubricant thereto from certain of said cavities when said valve is in substantially full open or closed position, said additional means including holes bored in said plug back of said second set of longitudinal grooves and at their upper ends interrupting said plug head seating surface inwardly of said annular groove and being in communication with said cavities only when said valve is in substantially full open or closed position.

DAVID M. KNOX.